US012743729B2

(12) United States Patent
Srinivasan et al.

(10) Patent No.: US 12,743,729 B2
(45) Date of Patent: Sep. 22, 2026

(54) VEGETATION MANAGEMENT USING PREDICTED OUTAGES

(71) Applicant: International Business Machines Corporation, Armonk, NY (US)

(72) Inventors: Harini Srinivasan, Tarrytown, NY (US); Gurkanwar Singh, Jersey City, NJ (US); Estepan Meliksetian, Westchester, NY (US); Jeffrey Gawrych, Longmont, CO (US); Trevor Kubie, Rowlett, TX (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 18/479,136

(22) Filed: Oct. 2, 2023

(65) Prior Publication Data

US 2025/0111449 A1 Apr. 3, 2025

(51) Int. Cl.
*G06Q 50/06* (2024.01)
*G01W 1/10* (2006.01)

(52) U.S. Cl.
CPC .............. *G06Q 50/06* (2013.01); *G01W 1/10* (2013.01)

(58) Field of Classification Search
CPC ................................ G06Q 50/06; G01W 1/10
See application file for complete search history.

(56) References Cited

U.S. PATENT DOCUMENTS 7,626,497 B2 12/2009 Mollenkopf
8,680,994 B2 3/2014 Leppanen et al.
11,296,955 B1 4/2022 Fletcher et al.
11,527,025 B2 12/2022 Abi-Rached et al.
2005/0096856 A1* 5/2005 Lubkeman ............ G06Q 50/06 702/58
2014/0324506 A1 10/2014 Garrity et al.
2016/0343093 A1 11/2016 Riland et al.
2018/0025458 A1 1/2018 Swamy (Continued)

FOREIGN PATENT DOCUMENTS

WO 2017021751 A1 2/2017

OTHER PUBLICATIONS

Milad Doostan et al., “Predicting Lightning-Related Outages in Power Distribution Systems; A statistical Approach”, May 6, 2020, IEEEAccess, https://ieeexplore.ieee.org/document/9084149 (Year: 2020).*

*Primary Examiner* — Yossef Korang-Beheshti
(74) *Attorney, Agent, or Firm* — Cantor Colburn LLP; Kelsey M. Skodje

(57) ABSTRACT

A computer-implemented method for predicting power outages for use in vegetation management is provided. Aspects include obtaining historical weather data for a geographical location including a utility line, obtaining historical outage data for the utility line, and training an outage prediction model based at least in part on the historical weather data and the historical outage data. Aspects also include generating, based on the historical weather data, a future storm data set, obtaining an outage prediction score for the utility line by inputting the future storm data set into the outage prediction model, and creating a vegetation trimming score for the utility line based at least in part on the outage prediction score, wherein the vegetation trimming score for the utility line indicates an urgency for performing trimming vegetation adjacent to the utility line.

18 Claims, 4 Drawing Sheets

(56) References Cited

U.S. PATENT DOCUMENTS

| | | | | |
|---|---|---|---|---|
| 2020/0235559 | A1* | 7/2020 | Neuenschwander .... | H02G 1/02 |
| 2022/0236451 | A1* | 7/2022 | Sun .......................... | G01W 1/10 |
| 2024/0168198 | A1* | 5/2024 | Cook ...................... | G01W 1/10 |

* cited by examiner

VEGETATION MANAGEMENT USING PREDICTED OUTAGES

BACKGROUND

The present invention generally relates to vegetation management, and more specifically, to predicting power outages for use in vegetation management.

As discussed herein, vegetation management includes identifying locations where tree trimming, or the like, should be performed to prevent potential adverse impacts on nearby utility lines by the vegetation. Current approaches for vegetation management methods use satellite imagery or Light Detection and Ranging (LIDAR) data to identify vegetation around utility lines, estimate the height of vegetation, and estimate the extant of vegetation. Based on the collected satellite imagery data and/or LIDAR data, distance metrics are calculated which reflect the distance of vegetation to utility lines and coverage metrices are calculated which reflect the coverage of the vegetation close to utility lines. The distance metrics and coverage metrics are used to identify individual spans of the utility lines that have vegetation that requires trimming.

While data sources like satellite imagery and/or LIDAR can be used to accurately capture proximity of vegetation to utility lines, obtaining such data is expensive and time consuming.

SUMMARY

Embodiments of the present invention are directed to a computer-implemented method for predicting power outages for use in vegetation management. The computer-implemented method includes obtaining historical weather data for a geographical location including a utility line, obtaining historical outage data for the utility line, and training an outage prediction model based at least in part on the historical weather data and the historical outage data. The method also includes generating, based on the historical weather data, a future storm data set, obtaining an outage prediction score for the utility line by inputting the future storm data set into the outage prediction model, and creating a vegetation trimming score for the utility line based at least in part on the outage prediction score, wherein the vegetation trimming score for the utility line indicates an urgency for performing trimming vegetation adjacent to the utility line.

Embodiments of the present invention are directed to a computer program product for predicting power outages for use in vegetation management. The computer program product includes one or more computer readable storage media having computer readable program code collectively stored on the one or more computer readable storage media. The computer readable program code is executed by a processor of a computer system to cause the computer system to perform operations. The operations include obtaining historical weather data for a geographical location including a utility line, obtaining historical outage data for the utility line, and training an outage prediction model based at least in part on the historical weather data and the historical outage data. The operations also include generating, based on the historical weather data, a future storm data set, obtaining an outage prediction score for the utility line by inputting the future storm data set into the outage prediction model, and creating a vegetation trimming score for the utility line based at least in part on the outage prediction score, wherein the vegetation trimming score for the utility line indicates an urgency for performing trimming vegetation adjacent to the utility line.

Embodiments of the present invention are directed to a computing system including a processor, a memory coupled to the processor and one or more computer readable storage media coupled to the processor. The one or more computer readable storage media collectively contain instructions that are executed by the processor via the memory to cause the processor to perform operations. The operations include obtaining historical weather data for a geographical location including a utility line, obtaining historical outage data for the utility line, and training an outage prediction model based at least in part on the historical weather data and the historical outage data. The operations also include generating, based on the historical weather data, a future storm data set, obtaining an outage prediction score for the utility line by inputting the future storm data set into the outage prediction model, and creating a vegetation trimming score for the utility line based at least in part on the outage prediction score, wherein the vegetation trimming score for the utility line indicates an urgency for performing trimming vegetation adjacent to the utility line.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
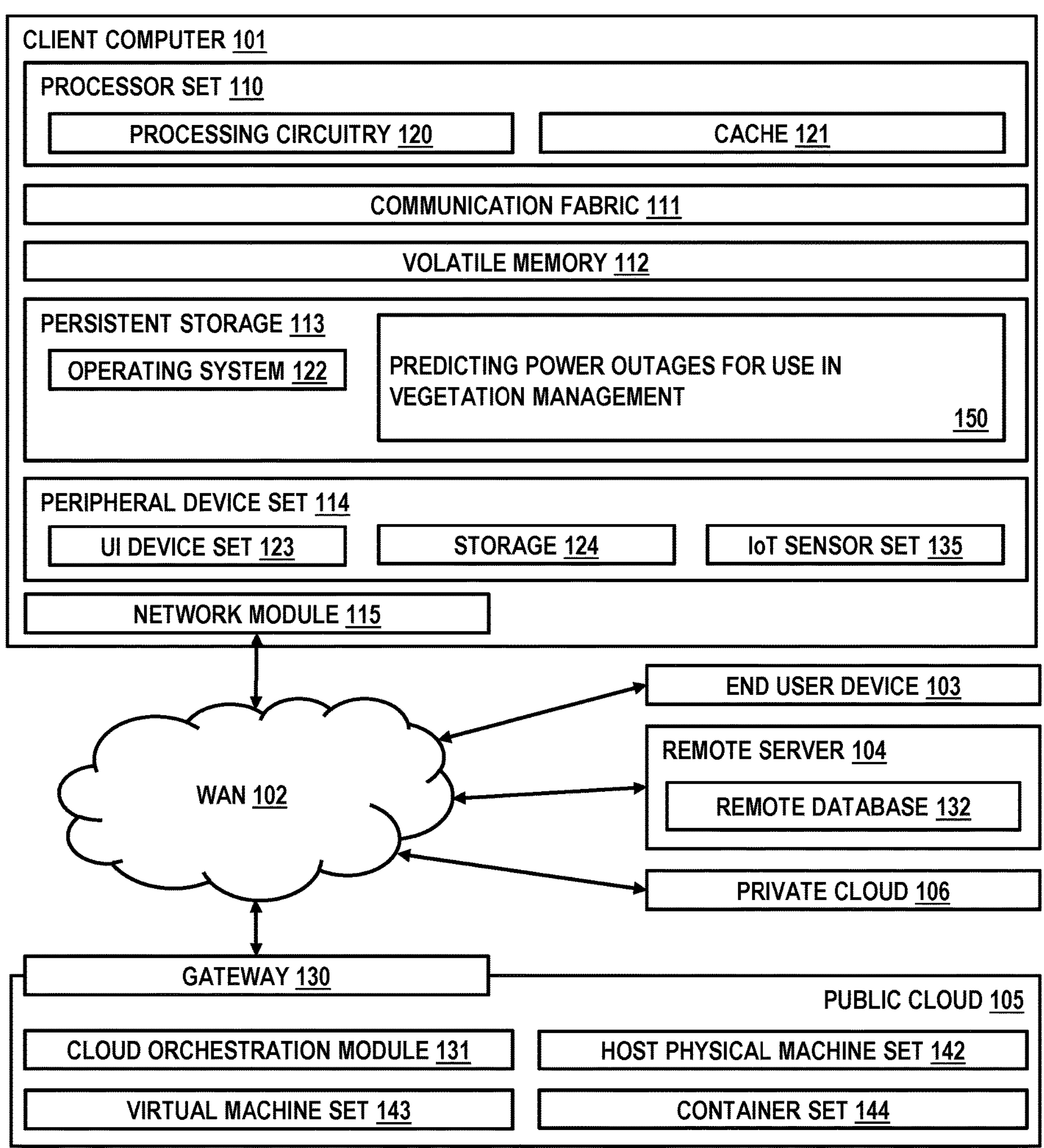
FIG. 1 is a schematic diagram of a computing environment in accordance with one or more embodiments of the present invention.

The diagrams depicted herein are illustrative. There can be many variations to the diagram or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

As discussed above, data sources like satellite imagery and/or LIDAR can be used to accurately capture the proximity of vegetation to utility lines and to identify spans of the utility lines that have vegetation that requires trimming. However, obtaining such data is expensive and time consuming. Accordingly, alternative methods of identifying spans of the utility lines that have vegetation that require trimming are needed.

Systems, methods, and computer program products for predicting power outages for use in vegetation management are provided. In exemplary embodiments, historic weather data for a geographic location including a span of a utility line and outage data for the span of the utility line are obtained and used to train an outage prediction model. The trained outage prediction model is configured to receive an input weather data set corresponding to a future time period for the geographic location and to predict whether an outage will occur on a span of a utility line in the geographic location during the future time period.

In exemplary embodiments, the input weather data set that is provided to the trained outage prediction model is a future storm data set that includes a set of possible storm weather data that is generated using historic weather data. In one embodiment, historical storms that occurred in the geographical area are analyzed to summarize storm characteristic and to generate a set of storms for a future time period with values of weather variables for each storm. In addition, a storm probability score is also generated to indicate the probability of the occurrence of each type of storm in the set of storms during the time period. The set of possible storms and the storm probability scores are used to create the future storm data set.

In exemplary embodiment, the trained outage prediction model is configured to predict whether each storm in the future storm data set will cause an outage on a span of a utility line. In addition, the trained outage prediction model is configured to generate an outage prediction score for the utility line which indicates the likelihood of an outage on the utility line during the entire time period. In exemplary embodiments, the outage prediction score is combined with one or more metrics, such as distance and coverage metrics, to create a vegetation trimming score for the utility line, where the vegetation trimming score for the utility line indicates an urgency for performing trimming vegetation adjacent to the utility line.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as predicting power outages for use in vegetation management (block 150). In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
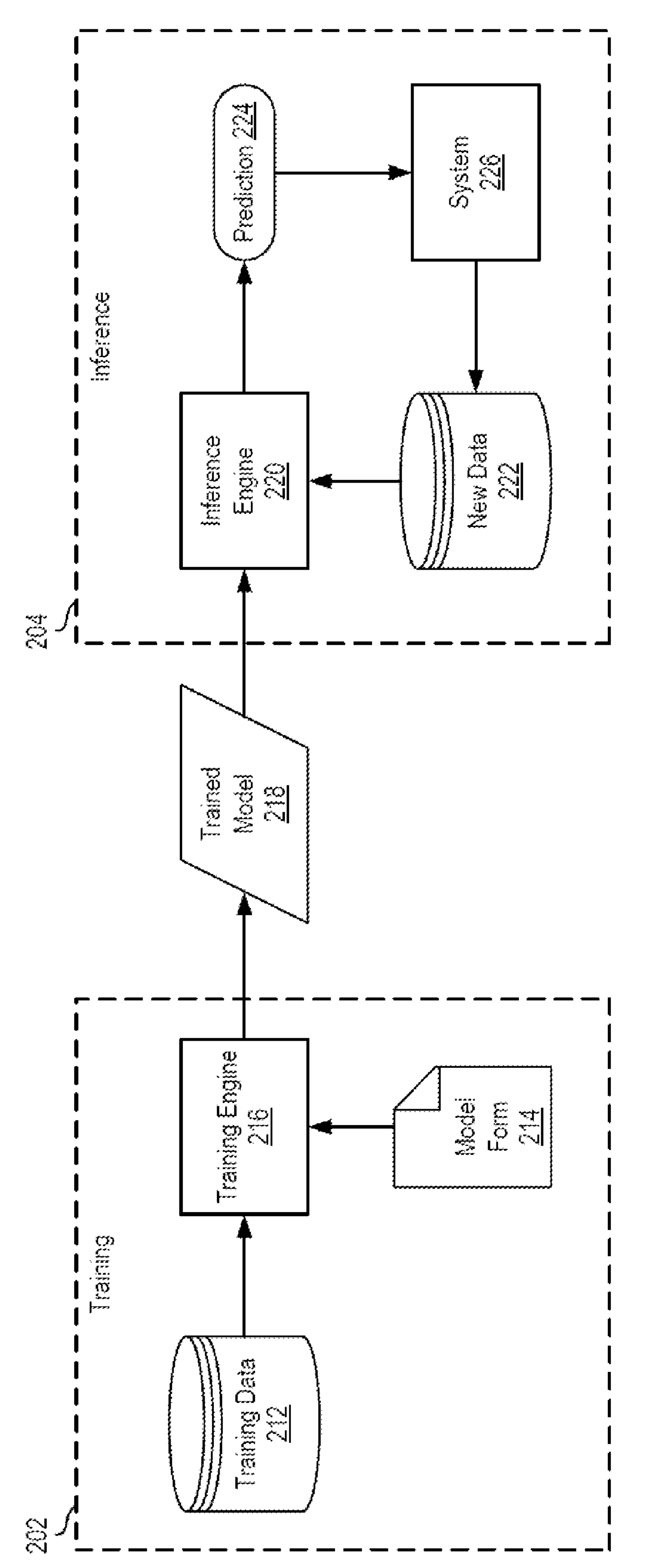
FIG. 2 is a block diagram of components of a machine learning training and inference system in accordance with one or more embodiments of the present invention.

Referring now to FIG. 2, a block diagram of components of a machine learning training and inference system 200 is shown. The machine learning training and inference system 200, in accordance with one or more embodiments of the invention, can utilize machine learning techniques to perform tasks, such as predicting outages on a utility line based on storm data. Embodiments of the invention utilize AI, which includes a variety of so-called machine learning technologies. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for managing information. In one or more embodiments of the present invention, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments of the invention described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was input. It should be appreciated that these same techniques can be applied in the case of localizing a target object referred by a compositional expression from an image set with similar visual elements as described herein.

GANs are an exciting recent innovation in machine learning and typically use an approach towards generative modelling using deep learning methods, such as CNNs. GANs are a clever way of training a generative model by framing the problem as a supervised learning problem with two sub-models: the generator model that we train to generate new examples and the discriminator model that tries to classify examples as either real (from the domain) or fake (generated). The two models are trained together in a zero-sum adversarial game until the discriminator model is fooled about half the time, meaning the generator model is generating plausible examples.

In one or more embodiments of the present invention, machine learning functionality can be implemented using a random forest classifier, which is an ensemble algorithm that combines multiple decision trees to make predictions. In general, random forest includes creating multiple decision trees, each trained on a different subset of the training data, which involves randomly selecting samples (with replacement) from the original dataset. For each decision tree in the ensemble, a random subset of features (variables) is selected for splitting at each node, which helps in decorrelating the trees and improving generalization. Each decision tree in the random forest is constructed independently and random forest uses the bootstrapped dataset and the selected subset of features to build a decision tree using a process called recursive partitioning or recursive binary splitting. At each node of the tree, the algorithm selects the best feature and the corresponding split point (value) that maximizes a certain criterion, typically the Gini impurity for classification tasks or mean squared error for regression tasks. Once all the decision trees are built, they can be used for predictions. For classification, each tree "votes" for a class, and the class with the most votes becomes the predicted class.

The machine learning training and inference system 200 performs training 202 and inference 204. During training 202, a training engine 216 trains a model (e.g., the trained model 218) to perform a task. Inference 204 is the process of implementing the trained model 218 to perform the task in the context of a larger system (e.g., a system 226).

The training 202 begins with training data 212, which can be structured or unstructured data. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 can be a model form of a CNN (convolutional neural network). The training 202 can be supervised learning, semi-supervised learning, unsupervised learning, reinforcement learning, and/or the like, including combinations and/or multiples thereof. For example, supervised learning can be used to train a machine learning model to predict outages on a utility line based on input storm data. To do this, the training data 212 includes outage data for a utility line and corresponding weather data for the geographic area including the utility line. In this example, the training engine 216 takes as input historical weather data from the training data 212, makes a prediction of an outage, and compares the prediction to the known label, i.e., the historical outage data. The training engine 216 then adjusts weights and/or biases of the model based on the results of the comparison, such as by using backpropagation. The training 202 can be performed multiple times (referred to as "epochs") until a suitable model is trained (e.g., the trained model 218).

Once trained, the trained model 218 can be used to perform inference 204 to perform a task, such as predicting outages on a utility line based on storm data. The inference engine 220 applies the trained model 218 to new data 222 (e.g., real-world, non-training data). For example, if the trained model 218 is trained to predicting outages on a utility line based on storm data, the new data 222 can be storm data that was not part of the training data 212. In this way, the new data 222 represents data to which the model 218 has not been exposed. The inference engine 220 makes a prediction 224 (e.g., whether an outage on a span of a utility line will occur based on the new data 222) and passes the prediction 224 to the system 226. The system 226 can, based on the prediction 224, taken an action, perform an operation, perform an analysis, and/or the like, including combinations and/or multiples thereof. In some embodiments of the invention, the system 226 can add to and/or modify the new data 222 based on the prediction 224.

In accordance with one or more embodiments of the present invention, the predictions 224 generated by the inference engine 220 are periodically monitored and verified to ensure that the inference engine 220 is operating as expected. Based on the verification, additional training 202 can occur using the trained model 218 as the starting point. The additional training 202 can include all or a subset of the original training data 212 and/or new training data 212. In accordance with one or more embodiments of the invention, the training 202 includes updating the trained model 218 to account for changes in expected input data.

Figure 3:
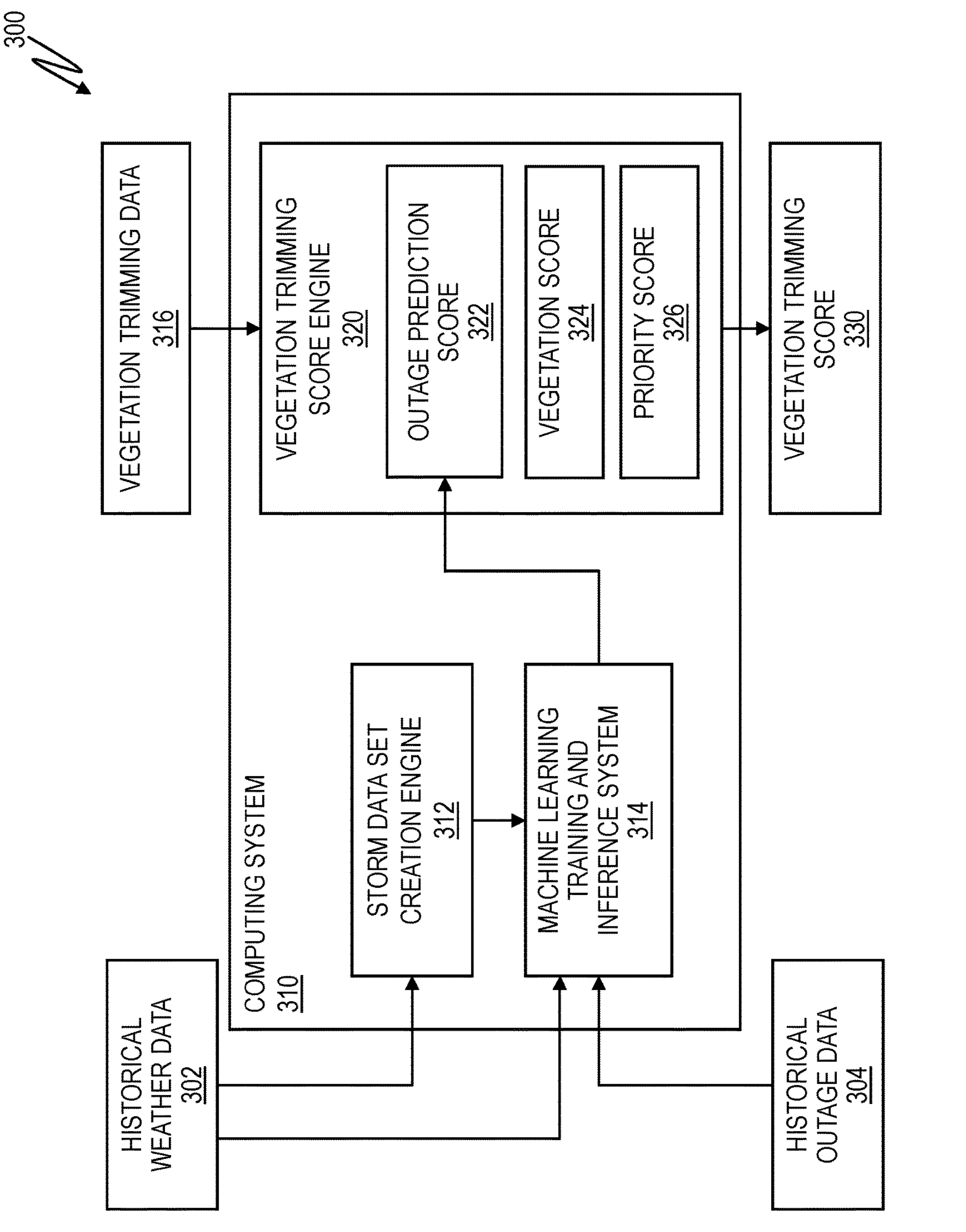
FIG. 3 is a schematic diagram illustrating a system for predicting power outages for use in vegetation management in accordance with one or more embodiments of the present invention.

Referring now to FIG. 3, a block diagram illustrating a system 300 for predicting power outages for use in vegetation management in accordance with one or more embodiments of the present invention is shown. As illustrated, the system 300 includes a computing system 310. In exemplary embodiments, the computing system 310 is embodied in a computer 101 such as the one shown in FIG. 1. The computing system 310 includes a storm data set creation engine 312, a machine learning training and inference system 314 (such as the machine learning training and inference system 200 shown in FIG. 2), and a vegetation trimming score engine 320.

In exemplary embodiments, the storm data set creation engine 312 is configured to receive historical weather data 302 corresponding to a geographical location that includes one or more spans of a utility line and to create a storm data set corresponding to a time period. The historical weather data includes storm data for previous storms that have occurred in the geographical area. The storm data can include, but is not limited to, a rainfall amount, an average wind speed, a maximum wind speed, a snowfall total, ice accumulation, and the like. In exemplary embodiments, the storm data set creation engine 312 analyzes the characteristics of previous storms and generates a set of storms that may occur during a future time period, along with a set of values of weather variables for each storm. The storm data set creation engine 312 also generates a storm probability score for each of the set of storms that indicates the probability of occurrence of the different types of storms in the future time period. The storm data set creation engine 312 utilizes the storm probability score and the set of storms to create the storm data set, which is provided as input to the machine learning training and inference system 314.

As described in more detail above with reference to FIG. 2, the machine learning training and inference system 314 is configured to create a trained model based on historical weather data 302 and on historical outage data 304. In exemplary embodiments, the machine learning training and inference system 314 receives a storm data set from the storm data set creation engine 312 and inputs the storm data set into the trained model to obtain a prediction of whether each storm in the storm data will cause an outage on the utility line. In exemplary embodiments, the machine learning training and inference system 314 is configured to generate an outage prediction score 322 that indicates the likelihood of an outage occurring during the time period corresponding to the storm data set.

In one embodiment, the storm data set includes expected daily meteorological data corresponding to a plurality of storms in the geographical location including the utility line during a time period. For example, the storm data set may include expected daily maximum wind speed, temperature, rainfall, etc. during a future time period of the next year. In these embodiments, the machine learning training and inference system 314 may be configured to calculate a daily outage score for each day during the time period, where the daily outage score indicates a likelihood that an outage will occur on a span of the utility line on a given day. In exemplary embodiments, the daily outage scores for each span of the utility line are combined to create the outage prediction score 322 for each span of the utility line. In one embodiment, the daily outage scores for each span are summed up to create the outage prediction score 322 for each span of the utility line. In another embodiment, a maximum daily outage score for each span is used as the outage prediction score 322 for each span of the utility line.

In exemplary embodiments, the vegetation trimming score engine 320 is configured to calculate a vegetation trimming score 330 for each span of a utility line based on one or more of the outage prediction score 322, a vegetation score 324, and a priority score 326. In exemplary embodiments, the outage prediction score 322 is received from the machine learning training and inference system 314 and indicates the likelihood of an outage on a span of a utility line based on a set of expected storms during a future time period. In one embodiment, the vegetation score 324 is calculated based on one or more of distance and coverage metrics. The distance and coverage metrices may be determined based on collected satellite imagery data and/or LIDAR data, where distance metrics indicate a distance of vegetation to a utility line and coverage metrices indicate a coverage of the utility line by the vegetation. In one embodiment, the priority score 326 is received from an operator of the utility line and indicates the presence of a sensitive points of interest on a span of a utility line, (e.g., hospitals, clinics, schools etc.).

In exemplary embodiments, the vegetation trimming score engine 320 is further configured to receive vegetation trimming data 316. The vegetation trimming data 316 can include scheduled vegetation trimming and/or vegetation trimming that has been recently performed on various spans of the utility lines. In exemplary embodiments, the vegetation trimming score engine 320 is configured to utilize the vegetation trimming data 316 in conjunction with the outage prediction score 322 and one or more of the vegetation score 324 and the priority score 326 to calculate the vegetation trimming score 330 for each span of a utility line. In exemplary embodiments, the vegetation trimming score 330 for each span of a utility line is calculated as a numerical value that is then mapped to one of an A, B, C, and D score, where an A score means trimming is not needed any time soon and where a D score means trimming should be done immediately.

Figure 4:
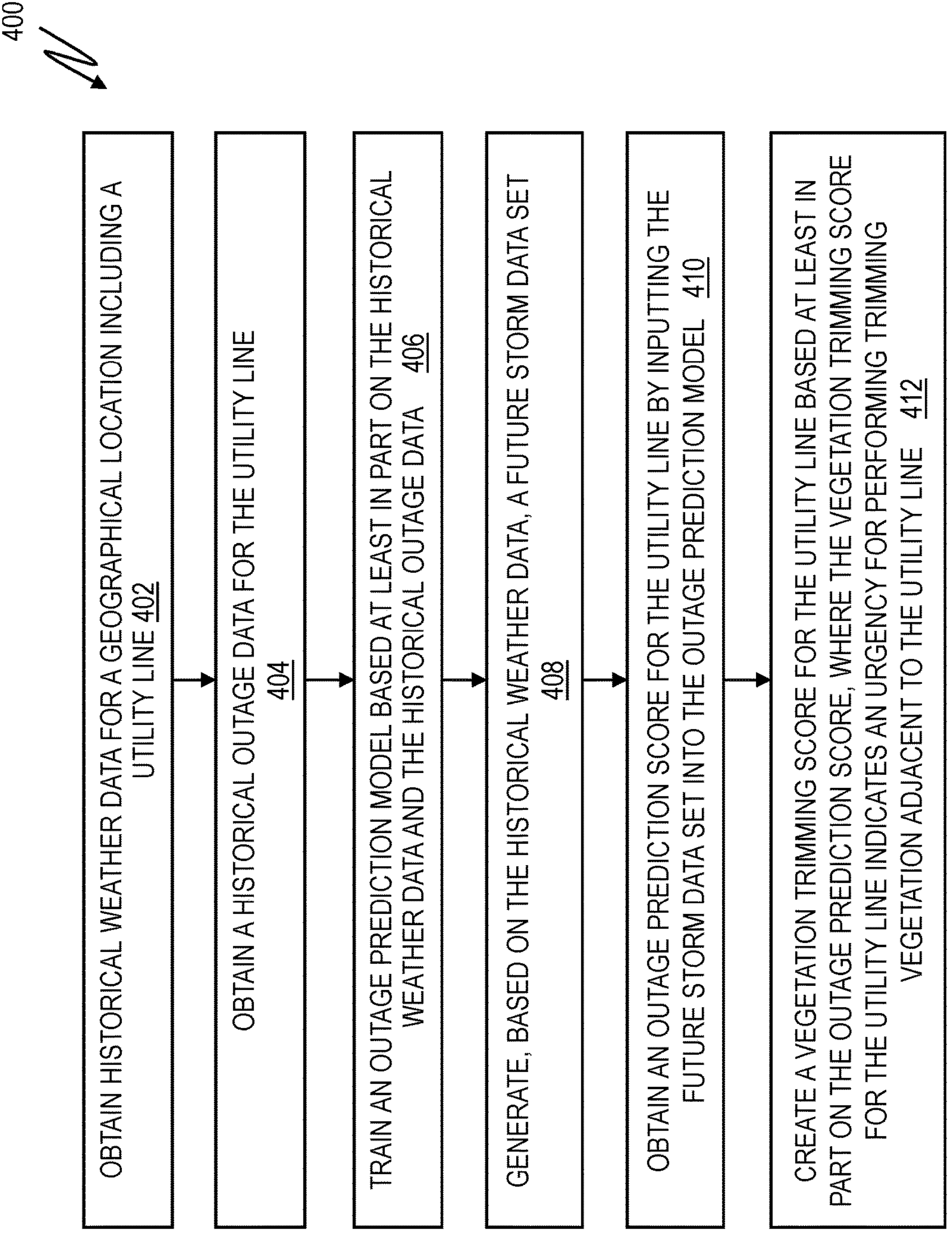
FIG. 4 is a flow diagram illustrating a computer-implemented method for predicting power outages for use in vegetation management in accordance with one or more embodiments of the present invention.

Referring now to FIG. 4, a flow diagram illustrating a computer-implemented method 400 for predicting power outages for use in vegetation management in accordance with one or more embodiments of the present invention is shown. In exemplary embodiments, the method 400 is performed by a computing system 310, such as the one shown in FIG. 3.

At block 402, the method 400 begins by obtaining historical weather data for a geographical location including a utility line. Next, at block 404, the method 400 includes obtaining historical outage data for the utility line. In exemplary embodiments, the utility line is one of an electrical transmission line, an electrical distribution line, and a communications line. At block 406, the method 400 includes training an outage prediction model based at least in part on the historical weather data and the historical outage data. In exemplary embodiment, the outage prediction model is a machine learning model employing a random forest classifier.

At block 408, the method 400 includes generating, based on the historical weather data, a future storm data set. In exemplary embodiments, the future storm data set includes meteorological data corresponding to a plurality of storms in the geographical location including the utility line during a time period, where the time period is at least one year long. In one embodiment, the future storm data set is generated using a storm probability score corresponding to each of the plurality of storms, where the storm probability score indicates a probability of occurrence each of the plurality of storms in the time period.

At block 410, the method 400 includes obtaining an outage prediction score for the utility line by inputting the future storm data set into the outage prediction model. In one embodiment, the future storm data set includes expected daily meteorological data corresponding to a plurality of storms in the geographical location including the utility line during a time period and the outage prediction model is configured to calculate a daily outage score for each day during the time period. In one embodiment, the daily outage score for each day during the time period is determined to have a value of one based on a determination that an outage will occur that day and to have a value of zero based on a determination that no outage will occur that day. The outage prediction model is configured to calculate the outage prediction score for the utility line based on a combination of the daily outage scores. For example, the outage prediction score may be a sum of the daily outage score for each day during the time period or an average of the daily outage score for each day during the time period.

In another embodiment, the future storm data set includes a set of storms that each have a corresponding storm probability score that indicates a probability of occurrence each of the plurality of storms in the time period. An outage score is calculated for each of the set of storms, where the outage score indicates a likelihood that the storm will cause an outage on the utility line. In this embodiment, the outage prediction score for the time period is calculated as the sum of an outage score for each of the set of storms multiplied by a storm probability score for each of the set of storms.

At block 412, the method 400 includes creating a vegetation trimming score for the utility line based at least in part on the outage prediction score, where the vegetation trimming score for the utility line indicates an urgency for performing trimming vegetation adjacent to the utility line. In exemplary embodiments, the vegetation trimming score is further based on one or more of a vegetation score and a priority score for the utility line.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for predicting power outages for use in vegetation management, the computer-implemented method comprising:

obtaining historical weather data for a geographical location including a utility line;

obtaining historical outage data for the utility line;

training an outage prediction model based at least in part on the historical weather data and the historical outage data;

generating, based on the historical weather data, a future storm data set for a time period, wherein the future storm data set includes a plurality of storms and a storm probability score corresponding to each of the plurality of storms;

obtaining an outage prediction score for the utility line by inputting the future storm data set into the outage prediction model, wherein the outage prediction model is configured to create an outage score for each of the plurality of storms and wherein the outage prediction score for the utility line is calculated as a sum of the outage scores multiplied by the storm probability score for each of the plurality of storms; and creating a vegetation trimming score for the utility line based at least in part on the outage prediction score for the utility line, wherein creating the vegetation trimming score comprises calculating a numerical value for the vegetation trimming score and mapping the numerical value to one of a plurality of trimming urgency categories, wherein the vegetation trimming score for the utility line indicates line when vegetation trimming adjacent to the utility line should be performed, the plurality of trimming urgency categories including a category indicating that vegetation trimming adjacent to the utility line should be performed immediately.

2. The computer-implemented method of claim 1, wherein the future storm data set includes expected daily meteorological data corresponding to a plurality of storms in the geographical location including the utility line during a time period.

3. The computer-implemented method of claim 2, wherein the future storm data set is generated using a storm probability score corresponding to each of the plurality of storms, wherein the storm probability score indicates a probability of occurrence each of the plurality of storms in the time period.

4. The computer-implemented method of claim 2, wherein the time period is at least one year.

5. The computer-implemented method of claim 2, wherein the outage prediction model is configured to calculate a daily outage score for each day during the time period.

6. The computer-implemented method of claim 5, wherein the daily outage score for each day during the time period is determined to have a value of one based on a determination that an outage will occur that day and to have a value of zero based on a determination that no outage will occur that day.

7. The computer-implemented method of claim 5, wherein the outage prediction model is configured to calculate the outage prediction score for the utility line based on a combination of the daily outage scores.

8. The computer-implemented method of claim 1, wherein the outage prediction model is a machine learning model employing a random forest classifier.

9. The computer-implemented method of claim 1, wherein the vegetation trimming score is further based on one or more of a vegetation score and a priority score for the utility line.

10. A computer program product having one or more computer readable storage media having computer readable program code collectively stored on the one or more computer readable storage media, the computer readable program code being executed by a processor of a computer system to cause the computer system to perform operations comprising:

obtaining historical weather data for a geographical location including a utility line;

obtaining historical outage data for the utility line;

training an outage prediction model based at least in part on the historical weather data and the historical outage data;

generating, based on the historical weather data, a future storm data set for a time period, wherein the future storm data set includes a plurality of storms and a storm probability score corresponding to each of the plurality of storms;

obtaining an outage prediction score for the utility line by inputting the future storm data set into the outage prediction model, wherein the outage prediction model is configured to create an outage score for each of the plurality of storms and wherein the outage prediction score for the utility line is calculated as a sum of the outage scores multiplied by the storm probability score for each of the plurality of storms; and creating a vegetation trimming score for the utility line based at least in part on the outage prediction score for the utility line, wherein creating the vegetation trimming score comprises calculating a numerical value for the vegetation trimming score and mapping the numerical value to one of a plurality of trimming urgency categories, wherein the vegetation trimming score for the utility line indicates line when vegetation trimming adjacent to the utility line should be performed, the plurality of trimming urgency categories including a category indicating that vegetation trimming adjacent to the utility line should be performed immediately.

11. The computer program product of claim 10, wherein the future storm data set includes expected daily meteorological data corresponding to a plurality of storms in the geographical location including the utility line during a time period.

12. The computer program product of claim 11, wherein the future storm data set is generated using a storm probability score corresponding to each of the plurality of storms, wherein the storm probability score indicates a probability of occurrence each of the plurality of storms in the time period.

13. The computer program product of claim 11, wherein the time period is at least one year.

14. The computer program product of claim 11, wherein the outage prediction model is configured to calculate a daily outage score for each day during the time period.

15. The computer program product of claim 14, wherein the daily outage score for each day during the time period is determined to have a value of one based on a determination that an outage will occur that day and to have a value of zero based on a determination that no outage will occur that day.

16. The computer program product of claim 14, wherein the outage prediction model is configured to calculate the outage prediction score for the utility line based on a combination of the daily outage scores.

17. The computer program product of claim 10, wherein the vegetation trimming score is further based on one or more of a vegetation score and a priority score for the utility line.

18. A computing system comprising:

a processor;

a memory coupled to the processor; and one or more computer readable storage media coupled to the processor, the one or more computer readable storage media collectively containing instructions that are executed by the processor via the memory to cause the processor to perform operations comprising:

obtaining historical weather data for a geographical location including a utility line;

obtaining historical outage data for the utility line;

training an outage prediction model based at least in part on the historical weather data and the historical outage data;

generating, based on the historical weather data, a future storm data set for a time period, wherein the future storm data set includes a plurality of storms and a storm probability score corresponding to each of the plurality of storms;

obtaining an outage prediction score for the utility line by inputting the future storm data set into the outage prediction model, wherein the outage prediction model is configured to create an outage score for each of the plurality of storms and wherein the outage prediction score for the utility line is calculated as a sum of the outage scores multiplied by the storm probability score for each of the plurality of storms; and creating a vegetation trimming score for the utility line based at least in part on the outage prediction score for the utility line, wherein creating the vegetation trimming score comprises calculating a numerical value for the vegetation trimming score and mapping the numerical value to one of a plurality of trimming urgency categories, wherein the vegetation trimming score for the utility line indicates line when vegetation trimming adjacent to the utility line should be performed, the plurality of trimming urgency categories including a category indicating that vegetation trimming adjacent to the utility line should be performed immediately.

* * * * *